(12) United States Patent
Adriani

(10) Patent No.: US 6,348,512 B1
(45) Date of Patent: Feb. 19, 2002

(54) MEDIUM DENSITY CHLORINATED POLYVINYL CHLORIDE FOAM AND PROCESS FOR PREPARING

(75) Inventor: Paul M. Adriani, Palo Alto, CA (US)

(73) Assignee: PMD Holdings Corp., Cleveland, OH (US)

( * ) Notice: Subject to any disclaimer, the term of this patent is extended or adjusted under 35 U.S.C. 154(b) by 0 days.

(21) Appl. No.: 08/722,703

(22) Filed: Sep. 30, 1996

Related U.S. Application Data

(63) Continuation of application No. 08/580,563, filed on Dec. 29, 1995, now abandoned.

(51) Int. Cl.[7] .................................................. C08J 9/10
(52) U.S. Cl. ............................. 521/85; 521/91; 521/92; 521/93; 521/134; 521/139; 521/145
(58) Field of Search ............................. 521/85, 91, 92, 521/93, 134, 139, 145

(56) References Cited

U.S. PATENT DOCUMENTS

| | | | |
|---|---|---|---|
| 2,996,489 A | 8/1961 | Dannis et al. ............. 260/92.8 |
| 3,100,762 A | 8/1963 | Shockney .................. 260/92.8 |
| 3,366,580 A | 1/1968 | Kraemer, Jr. et al. ........ 260/2.5 |
| 3,656,260 A | 4/1972 | Weaver et al. ................. 49/489 |
| 3,796,779 A | 3/1974 | Greenberg ................... 264/50 |
| 3,975,315 A | 8/1976 | Parks ....................... 260/2.5 R |
| 3,988,404 A | 10/1976 | Orimo et al. ............... 264/45.9 |
| 4,046,846 A | 9/1977 | Fujimori .................... 264/45.3 |
| 4,165,415 A | 8/1979 | Adachi et al. ............... 521/145 |
| 4,360,602 A | 11/1982 | Nehmey et al. ............... 521/95 |
| 4,370,286 A | 1/1983 | Nehmey et al. ............... 264/53 |
| 4,381,273 A | 4/1983 | Azzola ....................... 264/45.9 |
| 4,383,048 A | 5/1983 | Hall et al. ..................... 521/85 |
| 4,393,017 A | 7/1983 | Kim et al. ..................... 264/53 |
| 4,401,612 A | 8/1983 | Nehmey et al. ............... 264/53 |
| 4,409,165 A | 10/1983 | Kim ............................ 264/53 |
| 4,412,898 A | 11/1983 | Olson et al. ............ 204/159.18 |
| 4,413,065 A | 11/1983 | Hall et al. ..................... 521/82 |
| 4,448,658 A | 5/1984 | Olson .................... 204/159.18 |
| 4,676,995 A | 6/1987 | Fabris et al. ............... 427/54.1 |
| 4,690,862 A | 9/1987 | Hoffmann ................. 428/318.6 |
| 4,766,156 A | 8/1988 | Kimura et al. ................. 521/58 |
| 4,772,637 A | 9/1988 | Kimura et al. ................. 521/60 |
| 4,785,023 A | 11/1988 | Kimura et al. ................. 521/58 |
| 4,898,760 A | 2/1990 | Halberstadt et al. ........ 428/122 |
| 4,980,383 A | 12/1990 | Shimazu et al. .............. 521/85 |
| 5,112,548 A | 5/1992 | Roberts et al. ............. 264/171 |
| 5,143,772 A | 9/1992 | Iwasa .......................... 428/122 |
| 5,183,613 A | 2/1993 | Edwards ..................... 264/171 |
| 5,216,088 A | 6/1993 | Cinadr et al. ................ 515/356 |
| 5,340,880 A | 8/1994 | Backman et al. ......... 525/331.6 |

FOREIGN PATENT DOCUMENTS

| | | |
|---|---|---|
| CA | 710379 | 5/1965 |
| DE | 2302521 | 7/1974 |
| EP | 0041380 | 12/1981 |
| GB | 1184688 | 3/1970 |
| JP | 51-024667 | 2/1976 |
| JP | 55148381 | 6/1993 |
| JP | 5186626 | 7/1993 |
| WO | 95086554 | 8/1995 |

OTHER PUBLICATIONS

NASA STI Program Scientific & Technical Information, G.G. Kagramanov et al., "Study of the Kinetics of $CO_2$ Absorption in a Foam Layer at Atmospheric Pressure", Apr. 1994.

Journal of Vinyl Technology, Dec. 1992, vol. 14, No. 4, V. Kumar et al., "Microcellular PVC", pp. 191–197.

BFGoodrich Chemical Group Technical Service Bulletin No. 7, "Extrusion of Geon® Rigid Cellular Vinyl", Jul. 1983.

Sandia National Laboratories under U.S. Department of Energy Contract No. DE–AC04–76DP00789, E.M. Russick et al., "Supercritical Carbon Dioxide Extraction of Gel–Derived Polymer Foams", Jun. 1992.

Encyclopedia of Polymer Science and Engineering, vol. 2, Anionic Polymerization to Cationic Polymerization, Blowing Agents, 1985.

Cellular Polymers 1993, N.L. Thomas et al., "The Influence of Blowing Agent Type on the Properties of Extruded PVC Foam".

Artilce on "Foamed Rigid Vinyl for Building Products", Peggy S. Schipper et al., pp. 85–92, 1991.

Antec '94, "A New Blowing Agent Concept for the PVC–U Foam Industry", pp. 3485–3490.

Journal of Polymer Engineering, Kwang Ung Kim et al., "Rigid Foam Extrusion of Polyvinylchloride—Effects if Blowing Agent and Plasticizer", vol. 7, No. 1, 1986, pp. 1–12.

Several Pages of Rohm & Haas products, 1991.

*Primary Examiner*—Morton Foelak
(74) *Attorney, Agent, or Firm*—Thoburn T. Dunlap; Helen A. Odar

(57) ABSTRACT

The present invention relates to a medium density chlorinated polyvinyl chloride foam and the method of preparing such a foam. The foam having a specific gravity in the range of about 0.3 to about 1.5 comprises chlorinated polyvinyl chloride, a nitrogen containing decomposition type blowing agent, a tin stabilizer, a costabilizer and a high molecular weight process aid.

14 Claims, 2 Drawing Sheets

US 6,348,512 B1

MEDIUM DENSITY CHLORINATED POLYVINYL CHLORIDE FOAM AND PROCESS FOR PREPARING

This is a continuation of application Ser. No. 08/580,563, filed Dec. 29, 1995 abandoned.

FIELD OF INVENTION

This invention relates to a medium density chlorinated polyvinyl chloride foam composition. In particular, the invention relates to a medium density foam composition having a substantially closed cell spherical structure and a specific gravity of approximately 0.3 to approximately 1.5. Furthermore, the invention relates to the method of making such a medium density foamed composition.

BACKGROUND OF THE INVENTION

Foamed thermoplastic products are currently made using either physical or chemical blowing agents. Physical blowing agents are gases or liquids at temperatures below the processing temperatures of the thermoplastics. Generally, with physical blowing agents it is difficult to obtain uniform cell distribution due to the lack of uniformity of application of the physical blowing agent because of the difficulty in mixing the physical blowing agent with the highly viscous polymer melt. Furthermore, the addition of large amounts of physical blowing agents which are dissolved into a polymer dramatically decreases the polymer glass transition temperature making a highly plasticized mixture which is processed at lower temperatures thus allowing the processor to maintain the thermal stability of the polymer. Physical blowing agents are generally used in the formation of low density foams which generally have a specific gravity of less than 0.1.

Chemical blowing agents decompose or interact upon being heated to a temperature below the processing temperature of the thermoplastic and liberate a gaseous product in order to expand the thermoplastic. Chemical blowing agents by themselves are not generally used in low density foams because they are expensive and produce a limited reduction in density by themselves.

Foams made from chlorinated polyvinyl chloride, in particular, retain many of the properties of chlorinated polyvinyl chloride polymers such as heat resistance, chemical resistance, and weathering resistance, as compared to other thermoplastic polymers. Therefore, the foam of a chlorinated polyvinyl chloride can be used in a wide variety of applications.

For example, Adachi, et. al., in U.S. Pat. No. 4,165,415 discloses a method for preparing both low and medium density foams of CPVC. The method comprises impregnating a chlorinated polymer of vinyl chloride with a foaming agent consisting essentially of a lower aliphatic monohydric alcohol having between 1 to 5 carbon atoms. The foaming agent is considered a physical blowing agent. The mixture is then heated to a temperature and for a time sufficient to cause the mixture to foam in a closed mold.

U.S. Pat. No. 4,772,637 to Kimura, et. al., describes the method of preparing pre-expanded particles of CPVC containing a large amount of inorganic materials. The CPVC, inorganic materials and a solvent are kneaded to form a gel. The kneaded mixture is pelletized and a physical blowing agent is impregnated into the pellets. The pellets are then pre-expanded. The pre-expanded particles are then placed in a mold and heated with a heating source to expand and fill the mold in order to obtain a foamed article.

The abstract of Japanese Patent No. 51024667 describes a heat and flame resistant CPVC resin having a chlorine content of 63–69% in a nitrobenzene solution. An organic foaming agent such as azodicarbonamide, or dinitrosopentamethylene tetramine along with processing agents such as heat stabilizers, and lubricants were added. These ingredients were then foamed.

The abstract of Japanese Patent No. 5148381 discloses a composition which is foamed to give a five (5) millimeter cellular sheet with a density (sic) of 0.74. The composition is obtained by compounding dibutyl tin maleate, dioctyl tin maleate, a chemical foaming agent and an acrylic processing aid with a vinyl chloride polymer. The chemical foaming agent can be an azo compound, an azide compound, a nitroso compound, and/or a sulpho-hydrazide compound. The acrylic processing aid is a homopolymer or copolymer of methyl methacrylate, ethyl methacrylate, butyl methacrylate, copolymers of alkyarylates, and so forth.

German Patent Disclosure Publication No. DE-OS 2302521 describes a process for the preparation of a flexible thermoplastic foamed material. The patent describes heating a mixture of chlorinated polyethylene and chlorinated polyvinyl chloride and a blowing agent in a closed space at a temperature above the softening point of the chlorinated polymer and above the decomposition temperature of the blowing agent. The blowing agent that can be used in the process is azodicarbonamide.

U.S. Pat. No. 4,383,048 to Hall, et.al., discloses the process of making low density chlorinated polyvinyl chloride foam having a density of 0.32 grams/cubic centimeter or less. The low density foam that is produced that has a substantially closed cell structure, low thermal conductivity and excellent thermal stability without the substantial amounts of stabilizer required when azodicarbonamide is used as the nucleating agent. The foam is produced using a primary blowing agent which could be gaseous nitrogen and an alkali metal borohydride in conjunction with a proton donor activator as the nucleating agent.

A chlorinated polyvinyl chloride composition to be foamed is described in U.S. Pat. No. 4,370,286. The composition comprises a chlorinated polyvinyl chloride resin containing at least sixty (60%) percent chlorine, an effective amount of a blowing agent, an effective amount of a nucleating agent, a processing aid selected from copolymers of styrene and unsaturated nitrile containing more than fifty percent (50%) of styrene and ten to forty percent (10–40%) of nitrile. The foam formed from the composition is a low density foam.

Thus, there currently exists a need for a composition to form a medium density chlorinated polyvinyl chloride foam in which such foam retains the dynamic thermal stability of the foam without high levels of stabilizer wherein high levels of stabilizer for the purposes of this application are considered greater than four parts per one hundred parts of the base resin in order to allow for longer processing at higher temperatures. In particular, a need exists for a medium density CPVC foam having chemical resistance, good weathering characteristics, and high service temperature or Vicat softening temperature.

SUMMARY OF THE INVENTION

The present invention comprises a novel medium density chlorinated polyvinyl chloride foam composition comprising a chlorinated polyvinyl chloride polymer containing at least sixty percent (60%) chlorine by weight, a nitrogen containing decomposition type blowing agent, a tin stabilizer, a costabilizer and a high molecular weight process aid.

Preferably, the medium density chlorinated polyvinyl chloride foamed composition further includes an effective amount of lubricant(s).

The present invention also comprises the method of forming a medium density chlorinated polyvinyl chloride foam.

DETAILED DESCRIPTION

Figure 1:
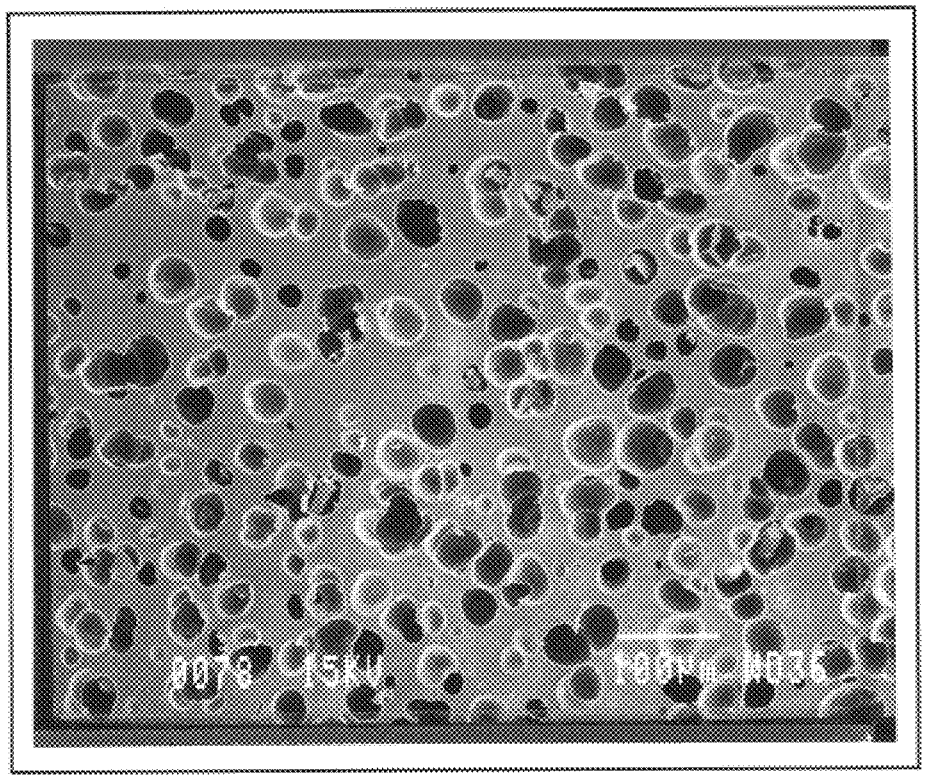
FIG. 1 is an electron micrograph at 150× magnification using a Scanning Electron Microscope (SEM) of the center of a section of a foamed CPVC sample according to the instant invention.
Figure 2:
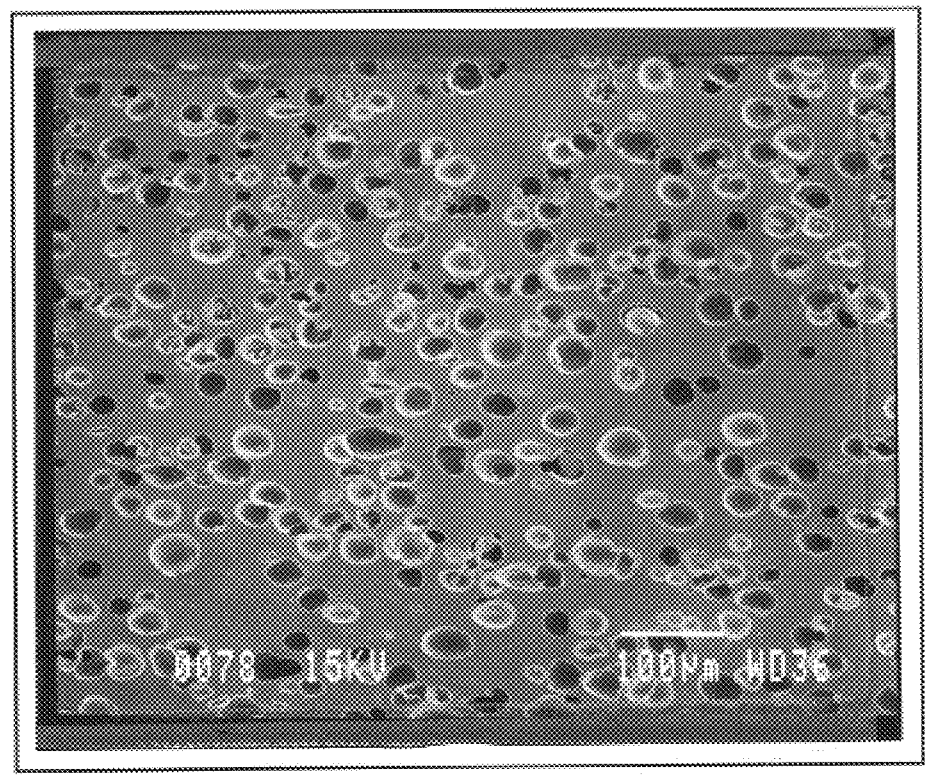
FIG. 2 is an electron micrograph at 150× magnification using an SEM illustrating the long edge of a section of a foamed CPVC sample according to the instant invention.
Figure 3:
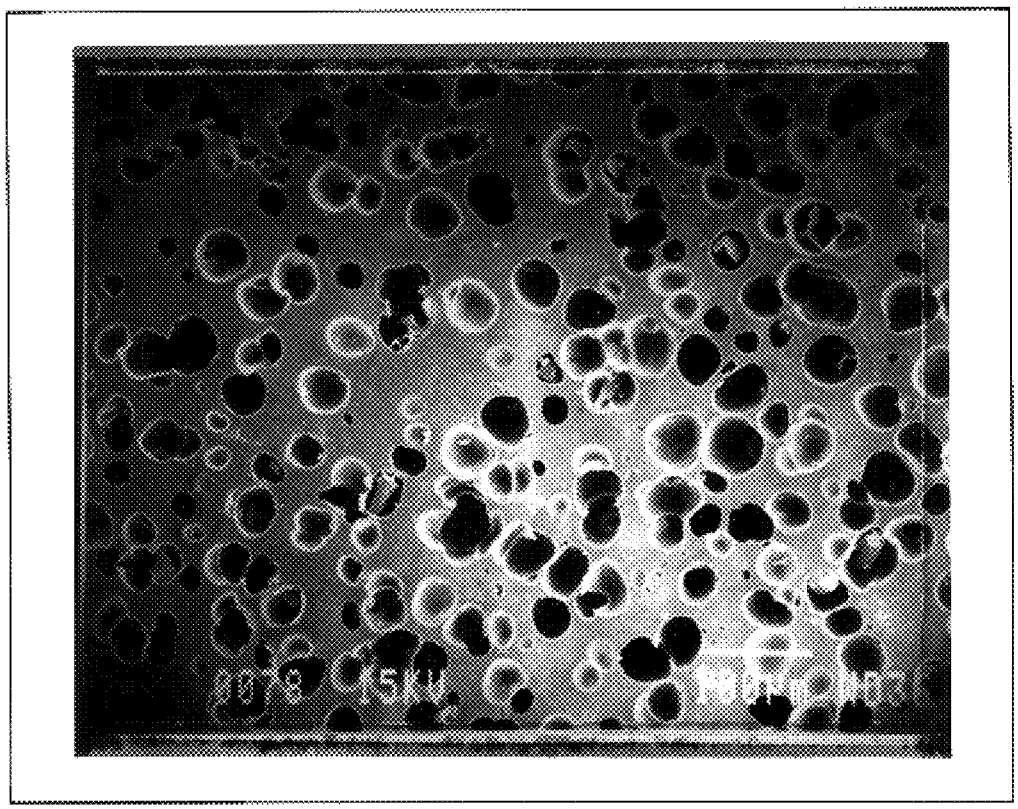
FIG. 3 is an electron micrograph at 150× magnification using a SEM of the area between the short and long edges and center of the foamed CPVC sample according to the instant invention.

The chlorinated polyvinyl chloride medium density foams of the present invention are prepared from compositions comprising chlorinated polyvinyl chloride polymer, a nitrogen containing decomposition blowing agent, a tin stabilizer, a costabilizer, and a high molecular process aid. Other ingredients generally added to chlorinated polyvinyl chloride compositions, such as, for example, but not limited to lubricants, processing aids and pigments may also be included in the compositions. The medium density foams of the present invention are illustrated in FIGS. 1 through 3. As seen in those figures, the medium density foams of the present invention are characterized as having a substantially closed cell spherical structure, a cell size substantially less than 500 microns, a specific gravity in the range of approximately 0.3 to approximately 1.5 and a foam core with a very thin densified skin. The densified skin on the foam, if found at all, is very thin, generally ranging from approximately 10 mils to approximately 50 mils.

The chlorinated polyvinyl chloride polymer (CPVC) used in producing the medium density foam of the present invention refers to products obtained by post chlorinating a polymer of vinyl chloride (PVC). Vinyl chloride polymers include both homopolymers and copolymers of vinyl chloride, having a chlorine content up to 56.7%. Vinyl chloride polymers may be formed by mass, suspension or emulsion polymerization.

CPVC is obtained by chlorinating homoploymers or copolymers containing less than fifty percent (50%) by weight of one or more copolymerizable comonomers. Preferably, comonomers are not used. However, if used, suitable comonomers include acrylic and methacrylic acids; esters of acrylic and methacrylic acid wherein the ester portion has from 1 to 12 carbons; hydroxyalkyl esters of acrylic and methacrylic acid (for example hydroxymethyl methacrylate, hydroxyethyl acrylate, hydroxyethyl methacrylate and the like); glycidyl ester of acrylic and methacrylic acid (for example glycidyl acrylate, glycidyl methacrylate and the like); alpha,beta-unsaturated dicarboxylic acids and their anhydrides (for example maleic acid, fumaric acid, itaconic acid and the like); acrylamide and methacrylamide; acrylonitrile and methacrylonitrile; maleimides; olefins (for example ethylene, propylene, isobutylene, hexene and the like); vinylidene halide; vinyl esters; vinyl ethers; crosslinking monomers (for example, diallyl phthalate, ethylene glycol dimethacrylate, methylene bis-acrylamide, divinyl ether, allyl silanes and the like).

Any post chlorination processes can be used to form CPVC polymer having more than fifty-seven percent (57%) by weight chlorine based upon the total weight of the polymer. Preferably, the CPVC polymer has a chlorine content in the range of about sixty percent (60%) to about seventy four percent (74%) by weight based upon the total weight of the polymer. The post chlorination processes which can be used include any commercial process or the like such as solution process, fluidized bed process, water slurry process, thermal process or liquid chlorine process. In as much as the post chlorination processes are known to the art as well as the literature, they will not be discussed in detail here. Rather reference is hereby made to U.S. Pat. Nos. 2,996,049; 3,100,762; 4,412,898 and 5,216,088 which are hereby fully incorporated by reference as to the method of forming CPVC by post chlorinating PVC. The preferred process in forming the CPVC from the PVC is the aqueous suspension process disclosed in U.S. Pat. No. 4,412,898.

In addition, blends of various CPVC resins can also be used. In those instances, the CPVC resin can be blended with another CPVC resin in an amount of other resin of about 1% to about 50%.

The CPVC used in the invention desirably will have a fused density in the range of approximately 1.45 to 1.65 grams/cubic centimeter at 25° Centigrade, an inherent viscosity (I.V.) in the range of about 0.41 to about 1.15 and a chlorine content of at least sixty percent (60%). The preferred fused density of the CPVC is in the range of about 1.5 to about 1.6 grams/cubic centimeter. The preferred inherent viscosity is in the range of about 0.6 to about 1.0. The preferred chlorine content of the CPVC is about 65% to about 70%. The most preferred chlorine content is 67%, with a 0.68 I.V. and a fused density of 1.5737 grams/cubic centimeter. Examples of suitable CPVC to use in forming the medium density foam of the instant invention include TempRite 634×683 CPVC, TempRite 687×563 CPVC and TempRite 639×683 CPVC, all available from The B.F. Goodrich Company. TempRite is a registered trademark of The B.F.Goodrich Company. The preferred resins are TempRite 687×563 and TempRite 637×670 CPVC. The most preferred CPVC resin is TempRite 637×670 CPVC.

The nitrogen containing decomposition type blowing agents are chemical blowing agents and are useful for foaming CPVC due to the low solubility of nitrogen gas, the major byproduct of these decomposition agents, into the CPVC. It is believed that the low solubility of the nitrogen gas is an important factor in generating fine cells in the foam. Examples of possible nitrogen containing decomposition type blowing agents include p-toluene sulfonyl-semicarbazide, p,p-oxybis benzene sulfonyl hydrazide, azodicarbonamide, 5-phenyltetrazole, dinitrosopentamenthylenetetramine, and mixtures thereof The p-toluene sulfonylsemicarbazide is available from Dong Jin under the tradename Unicell TS. Unicell OH is the Dong Jin trade name for p,p-oxybis benzene sulfonyl hydrazide. 5-phenyltetrazole is available as Unicell 5-PT from Dong Jin. Mixtures of nitrogen containing type blowing agents are also commercially available as Unicell T8 from Dong Jin. Dinitrosopentamethylenetetramine is commercially available from Dong Jin as Unicell GP9. Azodicarbonamide in various average particle diameters is available from Dong Jin as Unicell D-400 (4 μm average diameter); Unicell D-1500 (15 μm average diameter); Unicell D-200 (2 μm average diameter). About 0.1 to 10 parts by weight of the nitrogen containing decomposition type blowing agent is added to the foamable composition for every 100 parts of CPVC polymer in the composition. Preferably, about 0.2 to about 2.0 parts by weight of the nitrogen containing decomposition blowing agent is added to the foamable composition for every 100 parts of CPVC in the composition. Most preferably, 0.7 parts by weight of the nitrogen containing decomposition type blowing agent is added to the foamable composition containing 100 parts of CPVC.

Azodicarbonamide is the preferred nitrogen containing decomposition type blowing agent even though azodicarbonamide generally reduces the dynamic thermal stability of the CPVC resin when foamed by itself However, it is believed that this deleterious effect of the azodicarbonamide is overcome by the novel blend of ingredients in the composition of the present invention. Nonetheless, azodicarbonamide has excellent blowing properties, promotes fine cell structure, evolves large amounts of gas when decomposed per unit weight at a low cost. Furthermore, the azodicarbonamide by itself has an activation temperature in the range of about 185° C. to about 205° C., which is near the processing temperature of CPVC which is generally in the range of about 190° C. to about 220° C. The most preferred azodicarbonamide is Unicell D-200.

The tin stabilizer used in the present invention can be any stabilizer containing tin. Suitable stabilizers include tin salts of monocarboxylic acids such as stannous maleate. Additionally, organo-tin stabilizers such as dialkyl tin mercaptides, carboxylates, and thiazoles can be used. Examples of such organo-tin stabilizers include without limitation: dibutyltin dilaurate, dibutyltin maleate, di(n-octyl) tin maleate, dibutyltin bis(lauryl mercaptide), dibutyltin, S,S-bis(isooctyl thioglycoate), dibutyltin β-mercaptoproprionate, di-n-octyltin S,S-bis(isooctyl thioglycolate), and di-n-octyltin β-mercaptoproprionate. Usually from about 1 to about 5 parts by weight of stabilizer per 100 parts by weight of chlorinated polyvinyl chloride is used in the composition. Most preferably, the composition uses 3.5 parts of butyl tin thioglycolate per 100 parts of CPVC polys. Examples of commercially available tin stabilizers include Mark 292-S from Witco Chemical and Thermolite 31 HF from Elf Atochem.

In addition to the tin stabilizer, the foamable composition contains a costabilizer. The costabilizer is superior to merely increasing the tin stabilizer level since increasing the amount of tin stabilizer lowers the heat deflection temperature of the foam and is undesirable in typical end use applications. The costabilizer can be metal salts of phosphoric acids, or other acid acceptors that are not detrimental to the base CPVC resin used. Specific examples of metals salts of phosphoric acid include water-soluble, alkali metal phosphate salts, disodium hydrogen phosphate, orthophosphates such as mono-, di-, and triorthophosphates of said alkali metals, alkali metal phosphates and the like. Examples of acid acceptors not detrimental to the base CPVC resin include aluminum magnesium hydroxy carbonate hydrate, magnesium aluminum silicates and alkali metal alumino silicates. An example of a commercially available aluminum magnesium hydroxy carbonate hydrate is Hysafe 510, available from the J.M. Huber Company. Examples of magnesium aluminum silicates are molecular sieves such as for example Molsiv Adsorbent Type 4A from UOP. Examples of alkali metal alumino silicates are zeolites such as CBV 10A Zeolite Na-Mordenite by Synthetic Products Co. The most preferred costabilizer is disodium hydrogen phosphate (DSP). The DSP can be added separately to the foamable composition or can be added to the CPVC polymer during the processing of the CPVC polymer. Usually from about 0.1 to about 3 parts by weight of the costabilizer are added to the composition per 100 parts by weight of chlorinated polyvinyl chloride polymer. In the preferred embodiment, 1.3 parts by weight of disodium hydrogen phosphate is added to 100 parts of the CPVC polymer.

A high molecular weight process aid is included in the foamable composition. The high molecular weight process aids are necessary to provide melt elasticity or melt strength of the polymer melt formed within the extruder and high integrity of the foam cell walls during extrusion. High molecular weight process aids can be either acrylic process aids or copolymers of styrene and acrylonitrile. Suitable high molecular weight process aids include those high molecular process aids known in the art. The acrylic process aids which can be used in the instant invention are thermoplastic polymethyl methacrylate homo or copolymers with weight average molecular weights greater than 1,000,000. Hard, glassy copolymers of styrene and acrylonitrile having a glass transition temperature in excess of 60° C. and a dilute solution viscosity greater than 1.5 as measured in methylethyl ketone at 4% concentration and is selected from copolymers if styrene and an unsaturated nitrile containing more than 50% of said styrene and 10 to 40% of said nitrile are examples of the styrene acrylonitrile process aids. Examples of styrene-acrylonitrile polymers suitable for use in the foamable composition are Goodrite 2301×36, manufactured by the Zeon Company and Blendex 869 from General Electric Plastics. Preferably 10 parts of the styrene acrylonitrile copolymer are added to the composition per 100 parts of CPVC polymer. Examples of suitable acrylic process aids include poly(methyl methacrylate) available under the trade name Paraloid K-400, Paraloid K-128N, Paraloid K-125, all from Rohm & Haas; and the tradename Kaneka PA 10, Kaneka PA 20 and Kaneka PA 30, all three from Koneka Tex. Generally, from about 2 to about 20 parts of the acrylic process aid are added per 100 parts of CPVC. Preferably, from about 5 to about 15 parts of the acrylic process aid are added per 100 parts of CPVC. Most preferably, 8 parts of an acrylic process aid per 100 parts of CPVC are used.

The foamable composition preferably includes lubricants or lubricant mixtures. This includes any lubricants known to those in the art. Suitable lubricants include for example but not limited to various hydrocarbons such as paraffin; paraffin oils; low molecular weight polyethylene; oxidized polyethylene; amide waxes, metal salts of fatty acids; esters of fatty acids such as butyl stearate; fatty alcohols, such as cetyl, stearyl or octadecyl alcohol; metal soaps such as calcium or zinc salts of oleic acid; fatty amides of organic acids; polyol esters such ad glycerol monostearate, hexaglycerol distearate and mixtures thereof. Examples of possible fatty acids to be used include but are not limited to stearic acid and calcium stearate. Examples of fatty amides of organic acids include stearamide, and ethylene-bis-stearamide. Since several lubricants can be combined in countless variations, the total amount of lubricant can vary from application to application. Optimization of the particular lubricant composition is not within the scope of the present invention and can be determined easily by one of ordinary skill in the art. Generally from about one to about ten parts of lubricant are added to the foamable composition per one hundred parts of CPVC polymer. Preferably the following mixture of lubricants is used: Glycolube 674, an ester of a fatty acid (available from the Lonza Co.); Loxiol G-70, a proprietary fatty acid ester, (available from Henkel) and Aristowax 145, a paraffin wax (available from Unocal). In the preferred embodiment, the lubricant package includes 1.5 parts by weight of oxidized polyethylene, 0.5 parts of proprietary fatty acid ester and 0.5 parts of a fatty acid (based upon 100 parts of CPVC polymer) are added to the foamable composition.

The foamable composition preferably includes a metal release agent. An example of a metal release agent is a terpolymer of methylmethacrylate, styrene and butyl acrylate. The terpolymer of methylmethacrylate, styrene and butyl acrylate is available under the trade name of Paraloid K-175, available from Rohm & Haas. Preferably 1.0 parts of this terpolymer per 100 parts of CPVC polymer are added to the lubricant.

The foamable composition may also optionally include an activator for the nitrogen containing decomposition type blowing agent. Generally such an activator is used when a lower temperature for the foamable composition is desired in the extruder as well as when complete decomposition is desired. The activator helps the nitrogen containing decomposition type blowing agent to decompose faster and to generate more gases. Examples of suitable activators include tin salts of monocarboxylic acids and organo tin stabilizers. Examples of such organo-tin stabilizers include without limitation: dibutyltin dilaurate, dibutyltin maleate, di(n-octyl) tin maleate, dibutyltin bis(lauryl mercaptide), dibutyltin, S,S-bis(isooctyl thioglycoate), dibutyltin β-mercaptoprionate, di-n-octyltin S,S-bis(isooctyl thioglycolate), and di-n-octyltin β-mercaptoprionate. The most preferred activator is dibutyl tin dilaurate. The activator may be included in any amount useful to cause the activation. An example of an activator is Thermolite 149 from the Elf Atochem Company. Generally, 0.5 parts of activator may be included per 100 parts of CPVC polymer.

In addition, enhancing ingredients useful to enhance either the processing of a CPVC or the CPVC foam product can be included in the foamable composition. These include for example but not limited to pigments, such as titanium dioxide, carbon black, and iron oxide, fillers such as calcium carbonate, silica and the like, reinforcing agents such as glass fibers, and graphite fibers or glass spheres, other processing aids, impact modifiers, and alloying polymers and the like, antioxidants, antistatics. An example of an alloying polymer is chlorinated polyethylene. If an alloying polymer is used, preferably 0 to 5 parts of the alloying polymer are added per 100 parts of CPVC resin. Preferably, 3 parts of chlorinated polyethylene per 100 parts of CPVC polymer are included in the composition. An example of a suitable chlorinated polyethylene to be used in the instant invention includes Tyrin 3614A from the Dow Chemical Company. These enhancing ingredients can be added in an amount effective for the intended purpose. The amount and use would be within the purview of one of ordinary skill in the art and does not form part of this invention.

The ingredients for the foamable composition can be combined in any convenient manner. For example, all the ingredients can be mixed together uniformly by mixing means such as a Henschel high intensity mixer or other mixing means and then added to an extruder equipped with heating elements. Any extruder useful for processing of CPVC polymer can be used to foam the foamable composition provided the die is appropriately chosen. Preferably, a short land length is desired in the extruder die. Examples of suitable extruders include the Cincinnati Milacron CM-55 counter-rotating conical screw extruder and the Davis Standard 2.5 inch single screw extruder. The amount of the blowing agent, the extruder temperature and the screw speed of the extruder can be varied to obtain the desired specific gravity of the foamed product. As the foam composition goes through the extruder, it is heated and converted into a viscous melt. The nitrogen containing blowing agent is also activated and begins to decompose when the melt reaches a temperature of approximately 180° to approximately 200° Centigrade. However, although the gases are formed due to the decomposition of the blowing agent, the foamable composition does not expand while in the extruder. When the hot foam composition is discharged from the extruder through the extruder head into the atmosphere which has reduced pressure, the blowing agent expands the foam composition into the desired cellular product.

Alternatively, a two pellet system can be used. In this system, the CPVC polymer, tin stabilizer, the costabilizer and high molecular weight process aid can be mixed in an extruder. The extrudate can be cubed or otherwise pelletized to form the first pellet and stored for latter processing. In addition to the nitrogen containing decomposition blowing agent, other optional enhancing ingredients as well as a low melting carrier such as chlorinated polyethylene can be mixed together in an extruder at a temperature below the decomposition temperature of the nitrogen containing decomposition agent to form the second pellet. In the preferred embodiment, 2.1 parts of chlorinated polyethylene are added to the nitrogen containing blowing agent to form the second pellet. The extrudate can be cubed or otherwise pelletized and stored for processing as the second pellet. Preferably, the first and second pellets are the same size to promote uniform blending. When desired, the first and second pellets or cubes can be mixed together and extruded. As described above, the composition expands into a foam when the extrudate reaches the atmosphere.

The preferred method of mixing the ingredients of the foamable composition is the two pellet method. First, this method gives the flexibility to decide the amount of blowing agent to be added to the composition. Second, due to the difficulty in processing CPVC directly from powder, it is beneficial that a high work input melt fusion can be used in forming the first set of pellets. Further, the first pellet can be dried in a desiccant dryer to remove moisture which is often undesirable since moisture is a physical blowing agent and if uncontrolled, may result in uncontrollable foaming.

There are many uses of the medium density foam composition. For example, the composition can be used in woodlike fenestration components, such as for example but not limited to, window and door components. In addition, the foam can be used for construction, electrical and fluid handling applications such as roofing, siding, fencing, electrical junction boxes, plenum materials, track lighting, electrical enclosures, automotive; aircraft and mass transit interiors; drain, waste, and vent pipes; and other low pressure pipes.

The following non-limiting examples serve to further illustrate the present invention in greater detail.

EXAMPLES

Example 1

This example demonstrates the effect of nitrogen containing chemical blowing agents on the dynamic thermal stability (DTS) of the CPVC. The DTS test is designed to measure the processability of the material by measuring the time-torque relationship of a particular formulation at selected temperatures in accordance with ASTM D-2538. The ingredients set forth in Table 1 were mixed in a 10-liter capacity Henschel high intensity mixer at high speeds of about 1500 rpm until the ingredients reached a temperature of about 220° F. at which point the ingredients were dropped out of the mixer. To this control recipe, the nitrogen containing chemical blowing agents were added. The DTS of these samples were measured using a Brabender Plasticorder having a mixing bowl temperature of 210° C. and a rotor speed of 35 RPM. The measured DTS for each of the compounds is set forth in Table 2.

TABLE 1

| Ingredient | Parts by Weight |
|---|---|
| CPVC, 68%, 0.92 I.V., no costabilizer | 100 |
| Thermolite 31HF, Butyl Tin Stabilizer (Elf Atochem) | 3 |
| Blendex 338, ABS impact modifier (GE Plastics) | 7 |
| Lubricants AC 629A, oxidized polyethylene (Allied Signal) (1.5) Glycolube 674, ester of fatty acid (Lonza Co.) (1.0) | 2.5 |
| Titanium Dioxide | 2 |
| Chemical Blowing Agents, if added | 0.8 |

TABLE 2

| CHEMICAL BLOWING AGENT | DTS Time (min.) |
|---|---|
| Control, no blowing agent | 11.1 |
| Unicell OH*, p,p-oxybis benzene sulfonyl hydrazide | 7.0 |
| Unicell 5-PT*, 5-phenyltetrazole | 6.1 |
| Unicell TS*, p-toluene sulfonyl semicarbazide | 5.8 |
| Unicell T-8* | 4.6 |
| Unicell D-400*, Azodicarbonamide (4 µm particle diameter) | 4.4 |
| Unicell D-1500*, Azodicarbonamide (15 µm particle diameter) | 3.8 |
| Unicell GP9*, Dinitrosopentamethylenetetramine | 1.8 |

*These chemical blowing agents are available from Dong Jin.

As seen from Table 2, the nitrogen containing chemical blowing agents significantly reduce the DTS of the CPVC compound. A low DTS signifies a propensity to degradation or discoloration or burning when the foamable CPVC composition is used to produce a foamed article.

Example 2

In this example, the impact of using various CPVC resins in making a foamable composition was illustrated. The ingredients set forth in Table 3 were extruded and foamed compositions formed using the one step process described above in the specification. The samples were extruded on a Cincinnati Milacron 55 mm, counter rotating conical twin screw extruder. The temperature settings for barrel zones 1 through 4 were 340 F, 350 F, 360 F and 370 F, respectively. The temperature settings for the adapter and die were 350 F and 340 F, respectively. The screw oil temperature was 340 F. The screws were rotating at 20 RPM.

TABLE 3

| Ingredients | Sample 1 | Sample 2 | Sample 3 | Sample 4 |
|---|---|---|---|---|
| CPVC (68% Cl, 0.92 I.V.) | 100 | 65 | | 80 |
| CPVC(67% Cl, 0.67 I.V.) | | 35 | 100 | |
| CPVC (68% Cl, 0.54 I.V.) | | | | 20 |
| Styrene-acrylonitrile copolymer, 25% AN, Goodrite 2301 x 36 (Zeon Co.) | 10 | 10 | 10 | 10 |
| Chlorinated polyethylene, 36% Cl, Tyrin 3614A (Dow Chemicals) | 3 | 3 | 3 | 3 |
| Butyl tin stabilizer, Thermolite 31F (Elf Atochem) | 2.5 | 2.5 | 2.5 | 2.5 |
| Activator, Thermolite 149 Elf Atochem) | 0.5 | 0.5 | 0.5 | 0.5 |
| Titanium dioxide | 5 | 5 | 5 | 5 |
| Lubricants -oxidized polyethylene, AC 629A (Allied Signal) (0.2) -ester of fatty acid, Glycolube 674 (Lonza) (0.5) -metal release agent, Paraloid K-175 (Rohm & Haas) (1.0) | 1.7 | 1.7 | 1.7 | 1.7 |
| Disodium Hydrogen Phosphate | 1.3 | 1.3 | 1.3 | 1.3 |
| Azodicarbonamide, Unicell D-200 (Dong Jin) | 0.7 | 0.7 | 0.7 | 0.7 |
| Specific Gravity of Foam | 0.9 | 0.9 | 0.57 | <1.0 |

Example 3

This example illustrates the use of different high molecular weight process aids. The ingredients set forth in Table 4 were mixed in a 200-liter Henschel mixer at a high speed until the ingredients reached a temperature in the range of about 220° F. to 240° F. at which point they were dropped out of the mixer.

TABLE 4

| Ingredient | Sample 1 | Sample 2 | Sample 3 |
|---|---|---|---|
| CPVC (68% Cl, 0.92 I.V.) | 100 | | |
| CPVC (67% Cl, 0.67 I.V.) | | 100 | 100 |
| Styrene-acrylonitrile copolymer (25% AN), Goodrite 2301 x 36 (Zeon Co.) | 10 | 10 | |
| Acrylic polymer (95% methyl methacrylate), Paraloid K-400 (Rohm & Haas) | | | 8 |
| Chlorinated polyethylene, 36% Cl, Tyrin 3614A (Dow Chemical Co.) | 3 | 3 | |
| Butyl tin thioglycolate stabilizer, Thermolite 31-HF (Elf Atochem) | 3 | 2.5 | 3.5 |
| Activator, Thermolite 149 (Elf Atochem) | | 0.5 | |
| Dibutyl tin dilaurate, activating tin stabilizer, Thermolite 12 (Elf Atochem) | | | 0.5 |
| Titanium dioxide | 5 | 5 | 5 |
| Lubricants -oxidized polyethylene, AC 629A (Allied Signal) (0.2) -ester of fatty acid, Glycolube 674 (Lonza) (0.5) -metal release agent, Paraloid K-175 (Rohm & Haas) (1.0) | 1.7 | 1.7 | 2.2 |

TABLE 4-continued

| Ingredient | Sample 1 | Sample 2 | Sample 3 |
|---|---|---|---|
| Disodium hydrogen phosphate | 1.3 | 1.3 | 1.3 |
| Hydrotalcite, Hysafe 510 (J.M. Huber) | | | 1.0 |
| Azodicarbonamide, Unicell D200 (Dong Jin) | 0.7 | 0.7 | 0.2 |
| Specific Gravity | 0.85 | 0.57 | 0.42 |

This table illustrates the use of different CPVC resins as well as different high molecular weight process aids and activators. Each sample produces satisfactory CPVC foams.

Example 4

This example illustrates the effect of the lubricant level on CPVC foam processability. The samples listed below were extruded on a Cincinnati-Milacron 55 mm, counter rotating, conical twin screw extruder. The temperature settings for barrel zones 1 through 4 were 310° F., 315° F., 335° F., and 350° F., respectively. The temperature settings for the adapter and die were both at 350° F. The screw oil temperature was 330° F. The screws were rotating at 20 RPM. As shown in Table 5, too low of a level of lubricants causes degradation and discoloration.

TABLE 5

| Ingredients | Sample 1 | Sample 2 | Sample 3 |
|---|---|---|---|
| CPVC (68% Cl, 0.92 I.V.) | 100 | 100 | 100 |
| Styrene-acrylonitrile copolymer, 25% An, Goodrite 2301 × 36 (Zeon Co.) | 10 | 10 | 10 |
| Chlorinated Polyethylene, 36% Cl, Tyrin 3614A (Dow Chemical) | 3 | 3 | 3 |
| Butyl tin thioglycolate stabilizer, Thermolite 31HF (Elf Atochem) | 3 | 3 | 3 |
| Titanium dioxide | 5 | 5 | 5 |
| Oxidized polyethylene, AC 629AC (Allied Signal) | 0.2 | 0.2 | 0.2 |
| Ester of fatty acid, Glycolube 674 (Lonza Co.) | 0.5 | 0.5 | 0.5 |
| Metal release agent, Paraloid K-175 (Rohm & Haas) | 0.5 | 1.0 | 2.0 |
| Disodium hydrogen phosphate | 1.3 | 1.3 | 1.3 |
| Azodicarbonamide, Unicell D-200 (Dong Jin) | 0.7 | 0.7 | 0.7 |
| Specific Gravity | 0.9 | 0.85 | 0.9 |
| Discoloration Due to Color | yes | no | no |

Example 5

This example illustrates the use of the two pellet system described in the specification. The first pellet is formed from the following ingredients:

| | |
|---|---|
| CPVC, (67% Cl, 0.68 I.V.) | 100.0 |
| Acrylic Processing Aid (Paraloid K-400, Rohm & Haas) | 8.0 |
| Butyl tin thioglycolate stabilizer (Thermolite 31-HF, Elf Atochem) | 3.5 |
| Titanium Dioxide | 4.0 |
| Oxidized Polyethylene (AC 629 A, Allied Signal) | 1.5 |
| Metal Release Agent (Paraloid K-175, Rohm & Haas) | 1.0 |
| Ester of fatty acid (Glycolube 674, Lonza Co.) | 0.5 |
| Fatty acid ester (Loxiol G-70, Henkel) | 0.5 |
| Disodium Hydrogen Phosphate | 1.3 |

The second pellet is formed from 0.7 parts of azodicarbonamide (Unicell D-200) and 2.1 parts of chlorinated polyethylene.

The two pellets were mixed in a 2.5-inch Davis Standard Single Screw Extruder. The temperature settings for barrel zones 1 through 4 were 320° F., 330° F., 360° F., 350° F. The screws were rotating at 20 rpm. A medium density foam was made in accordance with this invention.

In summary, a novel and unobvious medium density CPVC foam has been described as well as the process of forming such a foam. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

I claim:

1. A medium density chlorinated polyvinyl chloride foam having a specific gravity in the range of about 0.3 to 1.5 comprising chlorinated polyvinyl chloride having a chlorine content of at least sixty percent (60%), a nitrogen containing decomposition type blowing agent, a tin stabilizer, a costabilizer selected from a member of the group consisting of disodium hydrogen phosphate, hydrotalcite, alkali citrates, aluminum magnesium hydroxy carbonate hydrate, magnesium aluminum silicate, and alkali alumino silicates, and a high molecular weight process aid and, optionally lubricant (s) and/or metal release agent(s).

2. A medium density chlorinated polyvinyl chloride foam of claim 1, wherein said nitrogen containing decomposition blowing agent comprises p-toluene sulfonyl-semicarbazide, p,p-oxybis benzene sulfonyl hydrazide, azodicarbonamide, 5-phenyltetrazole, dinitrosopentamenthylenetetramine, and mixtures thereof.

3. A medium density chlorinated polyvinyl chloride foam of claim 2, wherein said nitrogen containing decomposition blowing agent comprises azodicarbonamide.

4. A medium density chlorinated polyvinyl chloride foam of claim 3, wherein said azodicarbonamide is added in the range of about 0.1 to about 10 parts by weight for every 100 parts by weight of chlorinated polyvinyl chloride.

5. A medium density chlorinated polyvinyl chloride foam of claim 1, wherein said tin stabilizer is chosen from the group comprising: stannous maleate, dibutyltin dilaurate, dibutyltin maleate, di(n-octyl) tin maleate, dibutyltin bis (lauryl mercaptide), dibutyltin S,S-bis(isooctyl thioglycoate), dibutyltin β-mercaptoprionate, di-n-octyltin S,S-bis(isooctyl thioglycolate), and di-n-octyltin β-mercaptoprionate.

6. A medium density chlorinated polyvinyl chloride foam of claim 5, wherein said tin stabilizer is dibutyltin S,S-bis (isooctyl) thioglycolate.

7. A medium density chlorinated polyvinyl chloride foam of claim 5, wherein said tin stabilizer is added in the range of about 1 to about 5 parts by weight per 100 parts by weight of the chlorinated polyvinyl chloride.

8. A medium density chlorinated polyvinyl chloride foam of claim 1, wherein said costabilizer comprises disodium hydrogen phosphate.

9. A medium density chlorinated polyvinyl chloride foam of claim 1, wherein said high molecular weight process aid has a weight average molecular weight greater than 1,000,000 grams/mole.

10. A medium density chlorinated polyvinyl chloride foam of claim 1 wherein said high molecular weight process aid comprises a copolymer of styrene acrylonitrile or an acrylic processing aid.

11. A medium density chlorinated polyvinyl chloride foam of claim 10, wherein said high molecular weight process aid comprises an acrylic process aid.

12. A medium density chlorinated polyvinyl chloride foam of claim 11, wherein said acrylic process aid comprises polymethyl methacrylate.

13. A medium density chlorinated polyvinyl chloride foam of claim 10, wherein said high molecular weight process aid comprises a copolymer of styrene acrylonitrile.

14. A medium density chlorinated polyvinyl chloride foam of claim 1, further comprising chlorinated polyethylene.

* * * * *